(12) United States Patent
Niehoff

(10) Patent No.: US 7,264,215 B2
(45) Date of Patent: Sep. 4, 2007

(54) APPARATUS FOR SUPPLEMENTAL SUPPORT OF ITEMS USED IN MANUAL TASKS

(75) Inventor: Pete N. Niehoff, Greeley, CO (US)

(73) Assignee: Western Heat, LLC, Greeley, CO (US)

( * ) Notice: Subject to any disclaimer, the term of this patent is extended or adjusted under 35 U.S.C. 154(b) by 194 days.

(21) Appl. No.: 11/149,523

(22) Filed: Jun. 10, 2005

(65) Prior Publication Data

US 2005/0211856 A1 Sep. 29, 2005

(51) Int. Cl.
*A47G 29/00* (2006.01)

(52) U.S. Cl. .................. 248/371; 248/393; 248/397; 248/309.1; 248/161; 248/157; 248/423; 248/274.1; 248/292.12; 29/281.1; 254/124; 254/122; 254/93 L; 254/93 R; 269/73; 269/71

(58) Field of Classification Search .......... 248/371, 248/393, 397, 161, 157, 423, 309.1, 274.1, 248/292.12; 29/281.1; 254/124, 122, 93 L, 254/93 R; 269/73, 71; 182/181.1, 182.1
See application file for complete search history.

(56) References Cited

U.S. PATENT DOCUMENTS

| | | | | |
|---|---|---|---|---|
| 4,031,981 | A * | 6/1977 | Spencer | 182/153 |
| D293,052 | S | 12/1987 | Handler et al. | |
| 4,715,488 | A * | 12/1987 | Hewitt et al. | 193/35 R |
| 4,753,408 | A * | 6/1988 | Wailes | 248/371 |
| 5,010,978 | A * | 4/1991 | Jimmerson | 182/153 |
| D328,397 | S | 8/1992 | Handler et al. | |
| 5,299,656 | A * | 4/1994 | Grill | 182/186.4 |
| 5,335,753 | A | 8/1994 | Campbell | |
| 5,613,662 | A * | 3/1997 | Blackmore | 248/371 |
| 5,788,192 | A * | 8/1998 | Poole, Jr. | 248/49 |
| D432,246 | S | 10/2000 | Pestone | |
| 6,347,773 | B1 | 2/2002 | Gross et al. | |
| 6,357,705 | B1 * | 3/2002 | Hackett | 248/163.2 |
| D457,998 | S | 5/2002 | Pestone | |
| 6,758,449 | B1 | 7/2004 | Chen et al. | |
| 2003/0075033 | A1 * | 4/2003 | Speakman | 83/477.2 |

OTHER PUBLICATIONS www.deltawoodworking.com; 10" Compound Miter Saw with Stand; Apr. 5, 2005.
www.detnews.com/2003/homeimprovement; Miter stand is portable and versatile; Mar. 15, 2003.
www.mytoolstore.com/trojan/troj03.htm; Portable Miter Saw Stand; Apr. 5, 2005.
www.sears.com; Craftsman Miter Horse; Apr. 5, 2005.

(Continued)

*Primary Examiner*—Carl D. Friedman
*Assistant Examiner*—Todd M. Epps
(74) *Attorney, Agent, or Firm*—Santangelo Law Offices, P.C.

(57) ABSTRACT

The inventive technology relates to methods and apparatus for providing supplemental support for items used in manual tasks and may include one or more of the following features: a supplemental support apparatus, a supplemental support method, techniques for providing supplemental support in a compact manner, techniques for providing supplemental support in a variably-adjustable manner, techniques for correlating supplemental support to an overall workspace height, techniques for maintaining a parallel support surface through a variable-adjustment range, and techniques for retaining an item on a support surface.

26 Claims, 7 Drawing Sheets

OTHER PUBLICATIONS www.toolcenter.com/mitersawhelper.html; Sawhelper Ultrafence; Apr. 5, 2005.
http://images.amazon.com/images/P/B0000302XG.01._SCLZZZZZZ.; Apr. 5, 2005.
http://images.amazon.com/images/P/B0005RHPY.01._SCLZZZZZ...; Apr. 5, 2005.
http://www.amazon.com/exec/obidos/tg/detail; Dewalt DW723 Miter Saw Stand; Apr. 5, 2005.
http://images.rockler.com/Rockler/images/25716a-lg.jpg; Apr. 5, 2005.
www.plansnow.com; Aug. 2002 Home Publishing, Workbench Tool Review, Workbench Magazine; Miter Saw Stands, pp. 1-7.

* cited by examiner

APPARATUS FOR SUPPLEMENTAL SUPPORT OF ITEMS USED IN MANUAL TASKS

BACKGROUND OF THE INVENTION

Generally, the inventive technology disclosed herein relates to methods and apparatus for providing supplemental support for items used in manual tasks. More specifically, this inventive technology may involve providing such supplemental support in a compact and variably adjustable manner. The inventive technology may be particularly suited for use with hand tools such chop saws or miter saws.

In many everyday situations, an individual performing a manual task may require the assistance of some type of support to brace, prop, hold, or otherwise secure an item with which the individual may be working. Countless examples of such types of support may be readily apparent, such as desks, tables, benches, and the like. In some situations, for example as when an individual may be working with an item having a particularly long dimension, a supplemental support may be desired. Such kinds of supplemental support may include, for example, the foregoing supports just described, or perhaps even a more specialized kind of supplemental support, such as a sawhorse or a stand. In these situations, it may be typical to support one end of the item having a particularly long dimension on a primary support, and a second end on a supplemental support, thereby possibly providing a more stable support for the item than may be possible with merely a single support.

One field that may commonly involve the use of primary supports in conjunction with supplemental supports may be the construction industry. A particular example of this may be the perhaps widespread use in construction industry applications of hand tools having an integrated work surface. A work surface may be a surface upon which work is performed, perhaps including work such as tasks performed by hand. By the term integrated work surface, it may be understood that a hand tool may have a work surface integrated as part of the structure of the tool itself, perhaps providing an area in which the tool's function may be performed. Examples of hand tools having an integrated work surface may include chop saws and miter saws, for each of which it may be appreciated that a work surface exists as part of the structure of the tool, upon which an item may be placed and sawed. It may generally be that an integrated work surface of a chop saw or miter saw may be raised from the base of the chop saw or miter saw by an order of several inches. Moreover, it may be noted that the work surface area of a chop saw or miter saw may be relatively small in size, perhaps only as large as may be required to accommodate the reach of the saw blade, and in some cases possibly not exceeding about 36 inches square. Accordingly, in order to saw an item having a particularly long dimension, which may often be measured in multiple increments of feet, such as lengths of wood, tubing, pipe, sheet metal, steel, or other materials commonly used in construction industry applications, it may frequently be desirable to use a supplemental support in conjunction with a chop saw or miter saw to additionally support such an item being cut. It may further be appreciated that a desirable aspect of such a supplemental support may be the ability to support the item to be cut at a height level that is even to the integrated work surface of the chop saw or miter saw.

However, current practices in using supplemental supports on construction industry job sites may frequently involve a number of drawbacks. For example, although stands are commercially available for use with chop saws and miter saws, many of these stands may tend to be not supplemental supports, but rather whole supports capable of supporting in one integrated assembly both a chop saw or miter saw as well as the length of an item to be cut. While this type of whole support may afford certain advantages, a significant drawback may be that such supports may tend to be large and bulky. Such size and encumbrance aspects may make these kinds of stands difficult to move around from job site to job site or even from place to place within the often hectic environment of a particular job site. Moreover, these kinds of stands may frequently require involved set-up and break-down procedures between uses, further adding to the time and effort required for use.

Moreover, even in the case of true supplemental supports, such commercially available supplemental supports may exhibit their own drawbacks. For example, many commercially available supplemental supports may tend to be relatively tall, as may be exemplified by most typical sawhorses. Such sawhorses may tend to have a minimum usable height of perhaps two feet or possibly even more. Accordingly, to use such a sawhorse as a supplemental support in conjunction with a chop saw or miter saw, it may be necessary to position the chop saw or miter saw itself on a support of comparable height to the sawhorse. In this manner, it may be seen that the height of such a sawhorse is not coordinated to the work surface of a chop saw or miter saw itself, but rather to the height of the location on which a chop saw or miter saw may be placed. Such locations may include, for example, tables or work benches. Consequently, it may be appreciated that if a location of comparable height to the sawhorse is not available, it may not be possible to use the sawhorse as a supplemental support, because the resulting height differential between the sawhorse and the work surface of the chop saw or miter saw may result in the item being supported at an uneven angle.

More generally, it may be that commercially available supplemental supports are not dimensioned in a way that is coordinated to the work surface of hand tools having an integrated work surface, such as chop saws or miter saws. For example, it may often be desirable on a job site to place both the chop saw or miter saw itself and the supplemental support for a particularly long item on the same level, be it perhaps a raised support area, such as a table or workbench, or be it possibly even the ground. Naturally, it may be appreciated that if the work surface of a hand tool (such as a chop saw or miter saw) is raised from the base of the hand tool by a magnitude of inches, and the surface of the supplemental support (such as a sawhorse) is raised from the base of the supplemental support by a magnitude of feet, then the supplemental support may not be utilized at the same level as the hand tool without perhaps creating an uneven level for the item being supported.

Of course, it may often be that no support of any kind may be readily available at a job site. In such a situation, a user often may use the ground as the area to place a chop saw or miter saw. The user may then be required to find some type of makeshift supplemental support to hold the item being cut, a process itself requiring a degree of time and energy. Such a makeshift supplemental support frequently may be a piece of scrap wood, metal, or brick found at the jobsite and used to prop the item being cut. Because such scrap wood, metal, or brick may necessarily be taken as found, and not specifically coordinated to the height of the work surface of a chop saw or miter saw, the item being cut may be supported at an uneven height relative to the integrated work surface of the chop saw or miter saw. This may result in an uneven cut, premature fracture, or perhaps even a bend in the item being cut. Additionally, after one cut is made, a user may slide the item in a direction needed to make another cut. If the makeshift supplemental support is not stable, as may be the case for stacked scraps of wood, metal, or bricks, such a slide may cause the makeshift supplemental support to slip or collapse. Such instability may result in additional required time and effort needed to stop work, fix the makeshift supplemental support, and resume work. Such instability even may pose a safety risk to the user by creating the misleading impression of a stable support, where in actuality the possibility perhaps exists of a sudden shift or drop of the item while the cut is being made.

The foregoing problems regarding conventional supplemental supports may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTION

The inventive technology relates to methods and apparatus for providing supplemental support for items used in manual tasks and may include one or more of the following features: a supplemental support apparatus, a supplemental support method, techniques for providing supplemental support in a compact manner, techniques for providing supplemental support in a variably-adjustable manner, techniques for correlating supplemental support to an overall workspace height, techniques for maintaining a parallel support surface through a variable-adjustment range, and techniques for retaining an item on a support surface. Accordingly, the objects of the methods and apparatus for supplemental support of items used in manual tasks described herein address each of the foregoing problems in a practical manner. Naturally, further objects of the invention will become apparent from the description and drawings below.

DETAILED DESCRIPTION OF THE PREFERRED EMBODIMENTS

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
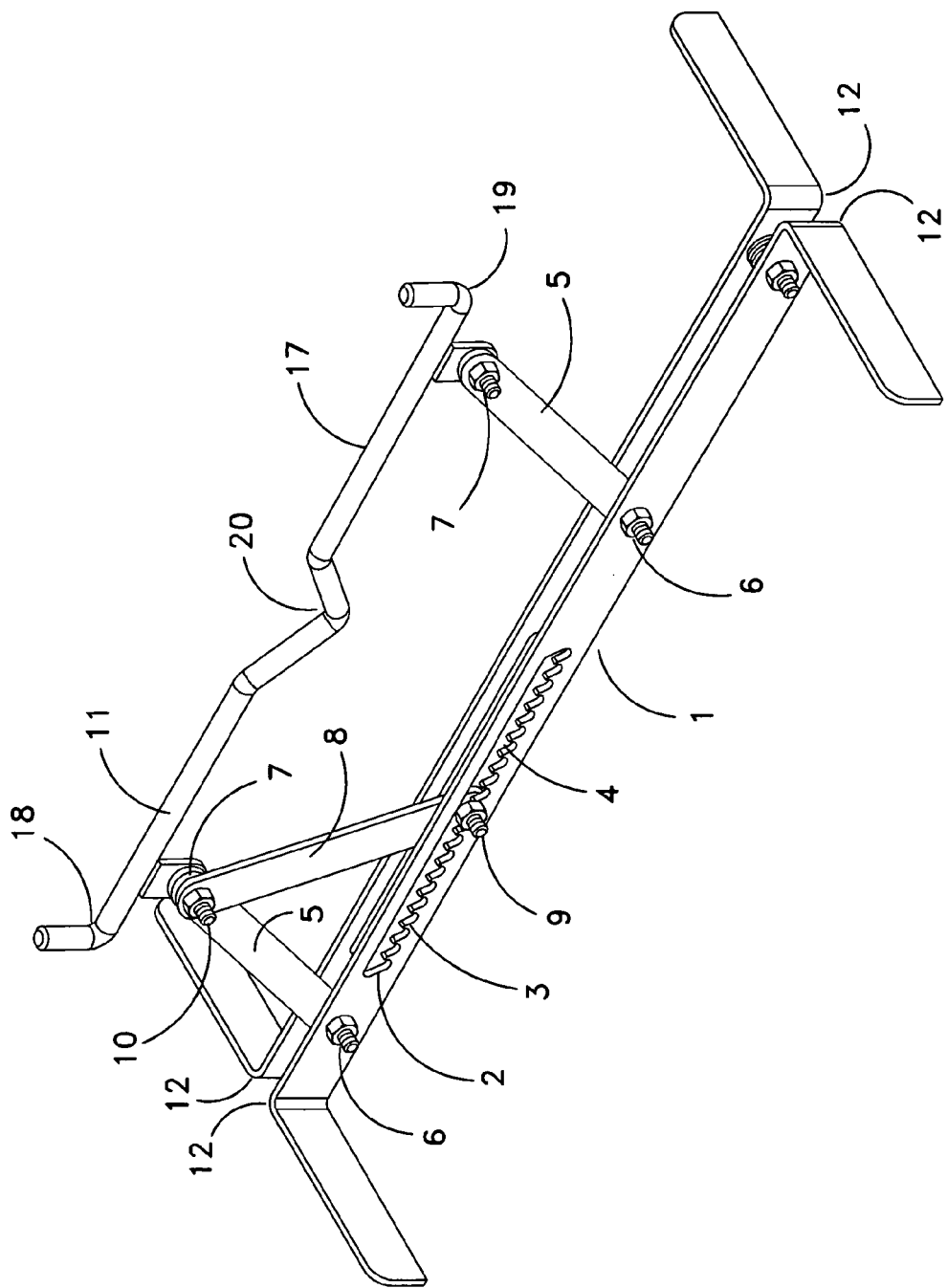
FIG. 1 is an isometric view of a supplemental support apparatus.
Figure 2:
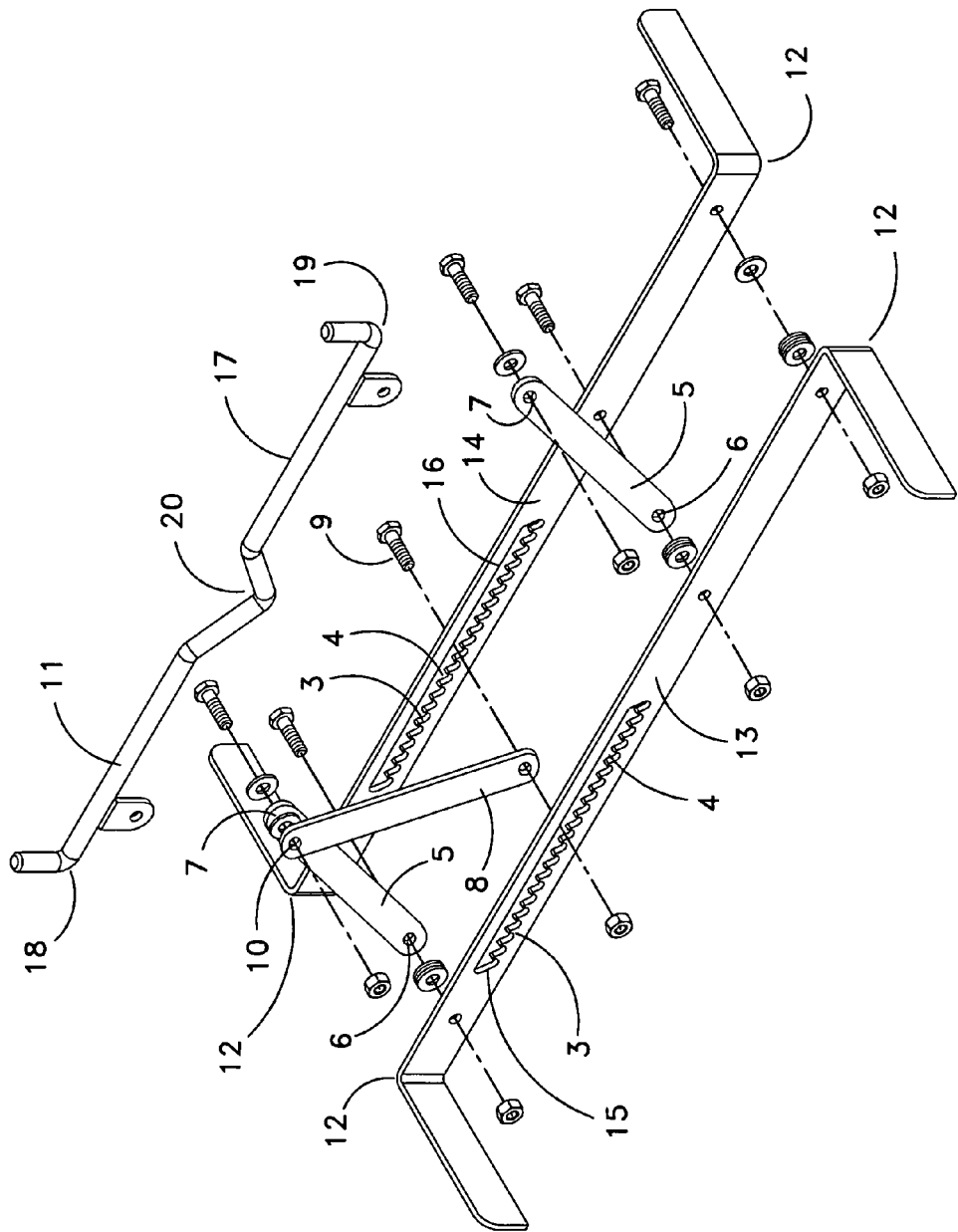
FIG. 2 is an exploded view of a supplemental support apparatus.
Figure 3:
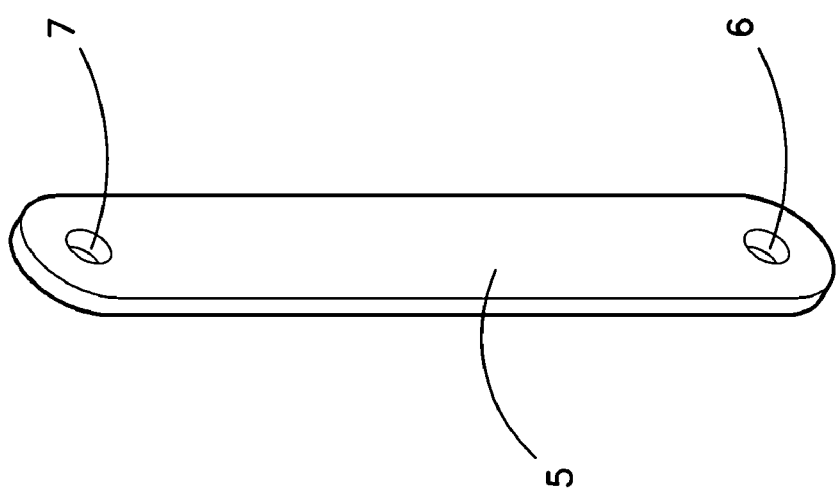
FIG. 3 is an isometric view of an unbent base strip.

Referring now primarily to FIGS. 1-3, certain embodiments of the inventive technology may include a supplemental support apparatus, which in some embodiments may be a compact variably-adjustable support stand. Such a supplemental support apparatus may include a base pedestal (1). A base pedestal (1) may include a supporting structure of a supplemental support apparatus, perhaps to confer stability to the supplemental support apparatus. A supplemental support apparatus may have a cutout (2) disposed on the base pedestal (1). A cutout (2) may be an opening passing through the structure of the base pedestal (1), such that an object may pass freely through the opening from one side of the base pedestal (1) to the other. A cutout (2) may further include a serrated lower edge (3). Such a serrated lower edge (3) may be a lower edge of a cutout (2) having a notched surface including two or more slots (4) that make up the serrations.

A supplemental support apparatus in certain embodiments may further have at least two vertical support members (5) joined to a base pedestal (1). A vertical support member (5) may be a component of a supplemental support apparatus that supports a supplemental support surface (11). In some embodiments, a vertical support member (5) may be shaped to form a rigid bar. Naturally, it may be appreciated that in various embodiments such a bar may take any variety of shapes, including perhaps a bar having an elongated cylindrical shape or perhaps an elongated flattened shape. Each vertical support member (5) may further include a first pivot point (6) and a second pivot point (7). A pivot point may be a point of a member about which such a member may be able to rotate. In certain embodiments, each vertical support member (5) may be joined to a base pedestal (1) at the location of a first pivot point (6) of that vertical support member (5).

In some embodiments, a supplemental support apparatus may include a vertical adjustment member (8). A vertical adjustment member (8) may be a component of a structural support apparatus, the adjustment of which raises or lowers a supplemental support surface (11). In some embodiments, a vertical adjustment member (8) may be shaped to form a rigid bar. Naturally, it may be appreciated that in various embodiments such a bar may take any variety of shapes, including perhaps a bar having an elongated cylindrical shape or perhaps an elongated flattened shape. In certain embodiments, a vertical adjustment member (8) may even be substantially identical to a vertical support member (5), with the exception of a stop adjustment element (9) substituted for a first pivot point (6). A vertical adjustment member (8) may further include a stop adjustment element (9). A stop adjustment element (9) may be a part of a vertical adjustment member (8) configured to be disposed within any individual slot (4) of a serrated lower edge (3). Accordingly, it may be understood that a vertical adjustment member (8) may hang freely within a cutout (2), supported by stop adjustment element (9) resting within any individual slot (4) of said serrated lower edge (3). A vertical adjustment member (8) may further include a third pivot point (10). In some embodiments, a vertical adjustment member (8) may be joined to one vertical support member (5) at the location of a third pivot point (10). In certain embodiments, a second pivot point (7) and a third pivot point (10) may even be collocated to form a single axis about which each of a vertical adjustment member (8) joined to a vertical support member (5) may rotate.

A supplemental support apparatus may in some embodiments include a supplemental support surface (11). A supplemental support surface (11) may be a surface upon which an item may be placed so as to be supported by a supplemental support apparatus. In certain embodiments, each vertical support member (5) may be joined to a supplemental support surface (11) at a second pivot point (7) of each vertical support member (5).

Now further considering primarily FIGS. 1-3, certain embodiments of the inventive technology may include a supplemental support method, which in some embodiments may be a method of providing variably-adjustable support in a compact space. Such a supplemental support method may include resisting a destabilizing force with a base pedestal (1). A destabilizing force may be any force that tends to compromise the stability of a supplemental support apparatus.

A supplemental support method in some embodiments may further involve translating a stop adjustment element (9) from any individual slot (4) of a serrated lower edge (3) of a cutout (2) to any other individual slot (4) of a serrated lower edge (3) of a cutout (2). Translating a stop adjustment element (9) may cause a corresponding change of orientation in a vertical adjustment member (8) to which stop adjustment element (9) may be joined. In turn, such a corresponding change of orientation of a vertical adjustment member (8) may require vertical adjustment member (8) to rotate about a third pivot point (10). Such a rotation about a third pivot point (10) may change an angular distance separating a vertical adjustment member (8) from a vertical support member (5) to which a vertical adjustment member (8) may be joined. In some embodiments, such a change in angular distance may occur about a third pivot point (10). As a result of a change in the angular distance separating vertical adjustment member (8) from a vertical support member (5), each vertical support member (5) may be required to rotate about each first pivot point (6) and each second pivot point (7) of each vertical support member (5). The rotation of each vertical support member (5) about a first pivot point (6) may necessarily cause a change in the angular distance between each vertical support member (5) and a base pedestal (1), wherein the angular distances associated with each vertical support member (5) change in a synchronized modality. Similarly, the rotation of each vertical support member (5) about a second pivot point (7) may necessarily cause a change in the angular distance between each vertical support member (5) and a supplemental support surface (11), wherein the angular distances associated with each vertical support member (5) change in a synchronized modality. By the term synchronized modality, it may be understood that a change in the aspect of any one angle associated with any one vertical support member (5) may cause a synchronized change in the aspect of any other angle associated with any other vertical support member (5).

Accordingly, certain embodiments may involve adjusting a separation distance between a supplemental support surface (11) and a base pedestal (1) by translating a stop adjustment element (9). In particular, it may be appreciated that the precise distance separating a supplemental support surface (11) and a base pedestal (1) may depend on an individual slot (4) in which stop adjustment element (9) may be disposed. Specifically, by translating stop adjustment element (9) from one individual slot (4) to another individual slot (4), the distance separating a supplemental support surface (11) and a base pedestal (1) may be increased or decreased, depending on the direction in which stop adjustment element (9) is translated within cutout (2).

It may be appreciated that a maximum separation distance may be achieved when a vertical support member (5) is allowed to achieve as close as possible to a 90 degree angle with respect to base pedestal (1), perhaps constrained only by the allowable range of motion prescribed by the length of cutout (2). Similarly, it may be appreciated that a minimum separation distance may be achieved when a vertical support member (5) is allowed to achieve as close as possible to a 0 degree angle with respect to a base pedestal (1), again perhaps constrained only by the allowable range of motion prescribed by the length of cutout (2). Further, it may be appreciated that a variety of discrete intermediate separation distances may be made possible by selecting the number of slots (4) in the serrated lower edge (3) of cutout (2). Supplemental support surface (11) may be maintained at any discrete separation distance by the action of stop adjustment element (9) resting within any individual slot (4), and supplemental support surface (11) may be supported by each vertical support member (5).

Moreover, it may be noted that the maximum separation distance may correspond to the distance separating a first pivot point (6) and a second pivot point (7) of each vertical support member (5). In this manner, a maximum height of a supplemental support surface (11) relative to a surface on which a supplemental support apparatus may be placed may be selected by setting the distance separating a first pivot point (6) and a second pivot point (7) to a desired value.

In some embodiments, a supplemental support apparatus may have a workspace correlated overall height. The term workspace may be understood to include a space that may exist within which an individual performing a manual task accomplishes the work required to complete that task. Examples of a workspace may include the space in which a chop saw or miter saw is used to cut an item, the space in which a plasma torch or gas torch is used to cut an item, or perhaps even the space in which welding may be accomplished. It may be appreciated that a workspace may be a three-dimensional volume of space having an associated height dimension. By the term workspace correlated overall height, it may be understood that a supplemental support apparatus may have an overall height correlated to the height dimension of a workspace. In certain embodiments, an overall height of a supplemental support apparatus that is correlated to a height dimension of a workspace may be an overall height of a supplemental support apparatus that is substantially equal to a height dimension of a workspace. Examples of a workspace correlated overall height in some embodiments may include a height correlated to an integrated work surface of a hand tool, or perhaps even an absolute height from about 2 inches to about 5.5 inches.

A workspace correlated overall height of a supplemental support apparatus may be achieved in certain embodiments by establishing each vertical support member (5) to have a workspace correlated adjustment length. An adjustment length of a vertical support member (5) may be a length of a vertical support member (5), such that a change in the orientation of the vertical support member (5) defines the range of possible separation distances separating a supplemental support surface (11) from a base pedestal (1). A workspace correlated adjustment length of a vertical support member (5) may be an adjustment length that is selected to provide a range of possible separation distances separating a supplemental support surface (11) from a base pedestal (1) that is correlated to the height dimension of a workspace. Examples of a workspace correlated adjustment length of a vertical support member (5) in certain embodiments may include a length correlated to an integrated work surface of a hand tool, or perhaps even an absolute length that does not exceed 5 inches.

It further may be appreciated that a supplemental support method in some embodiments may involve accomplishing each step of the method within a workspace correlated overall height range. A workspace correlated overall height range may be the range of separation distances between a supplemental support surface (11) and a base pedestal (1) that may be achieved by a supplemental support apparatus having a workspace correlated overall height. Examples of a workspace correlated overall height range in some embodiments may include a range correlated to an integrated work surface of a hand tool, or perhaps even an absolute range from about 2 inches to about 5.5 inches.

In certain embodiments, a supplemental support surface (11) may be arranged in substantially parallel relation to a base pedestal (1) of a supplemental support apparatus. Moreover, a supplemental support method in certain embodiments may involve maintaining a supplemental support surface (11) in substantially parallel relation to a base pedestal (1) while accomplishing the step of adjusting a separation distance between the supplemental support surface (11) and the base pedestal (1). For example, embodiments of the inventive technology may involve establishing an equal pivot point separation distance on each vertical support member (5) and arranging each vertical support member (5) to have an equal angle with respect to a base pedestal (1). In this manner, it may be appreciated that a supplemental support surface (11) may retain a parallel orientation with respect to a base pedestal (1) through the range of motion described by each vertical support member (5) rotating about a first pivot point (6) as the separation distance between supplemental support surface (11) and base pedestal (1) is adjusted. Accordingly, a supplemental support apparatus may include at least two vertical support members (5), each arranged perhaps to define an equal angle with respect to a base pedestal (1), and each having a first pivot point (6) and a second pivot point (7) separated by an equal distance along each vertical support member (5). Further, a supplemental support apparatus in some embodiments may include a parallel surface adjustment range, which may be a range through which the separation distance between a supplemental support surface (11) and a base pedestal (1) may be adjusted while maintaining the supplemental support surface (11) in substantially parallel relation to the base pedestal (1).

Figure 4:
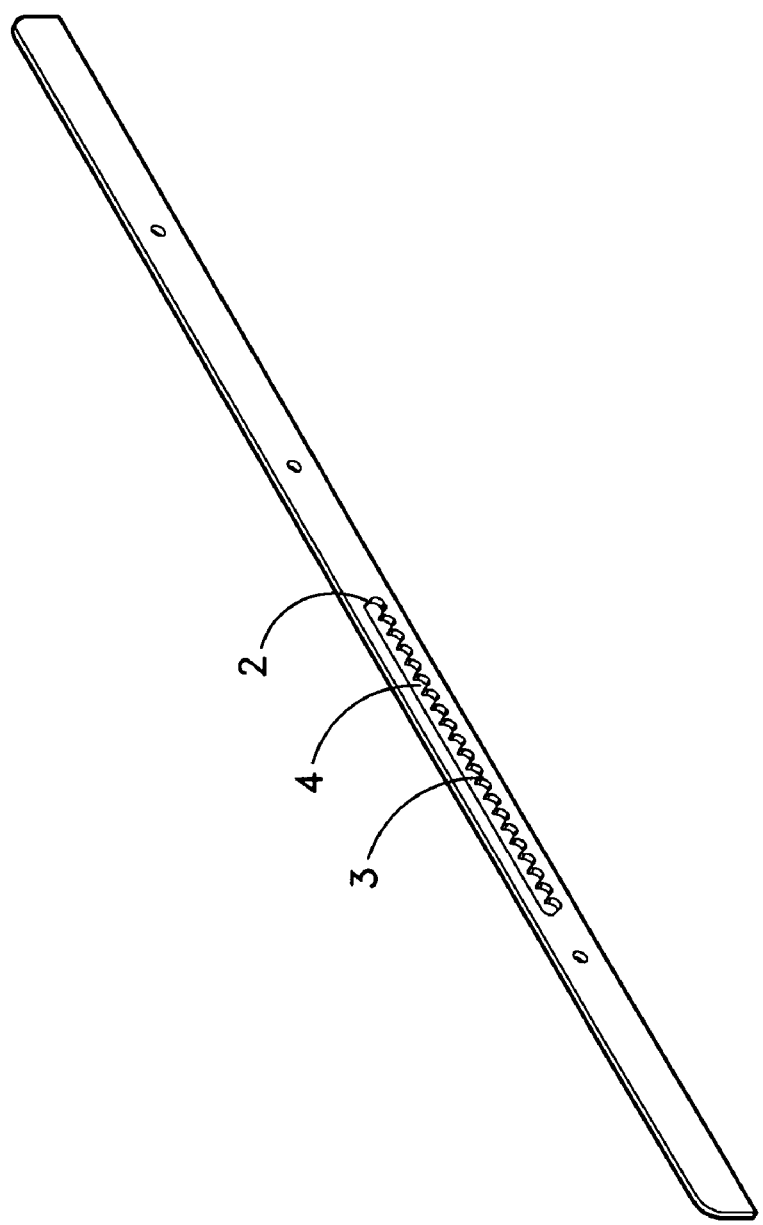
FIG. 4 is an isometric view of a first base strip.
Figure 5:
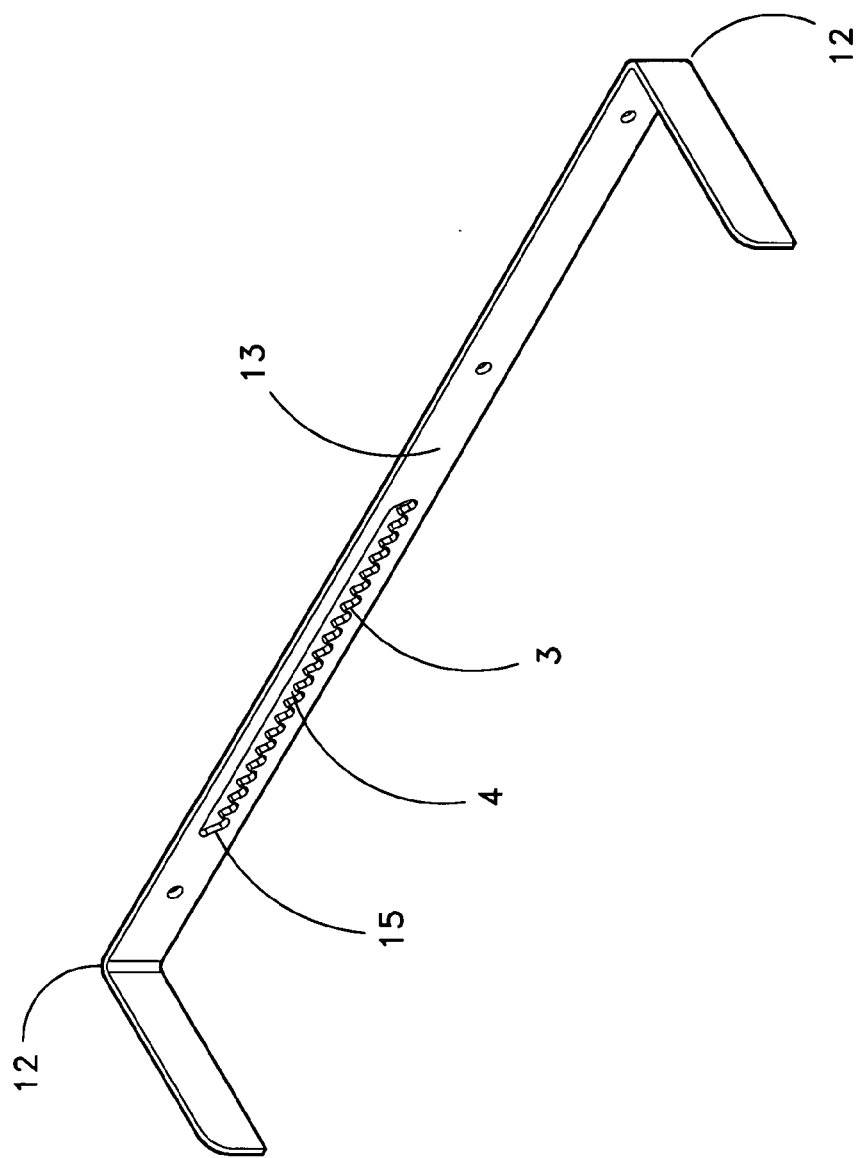
FIG. 5 is an isometric view of a second base strip.
Figure 6:
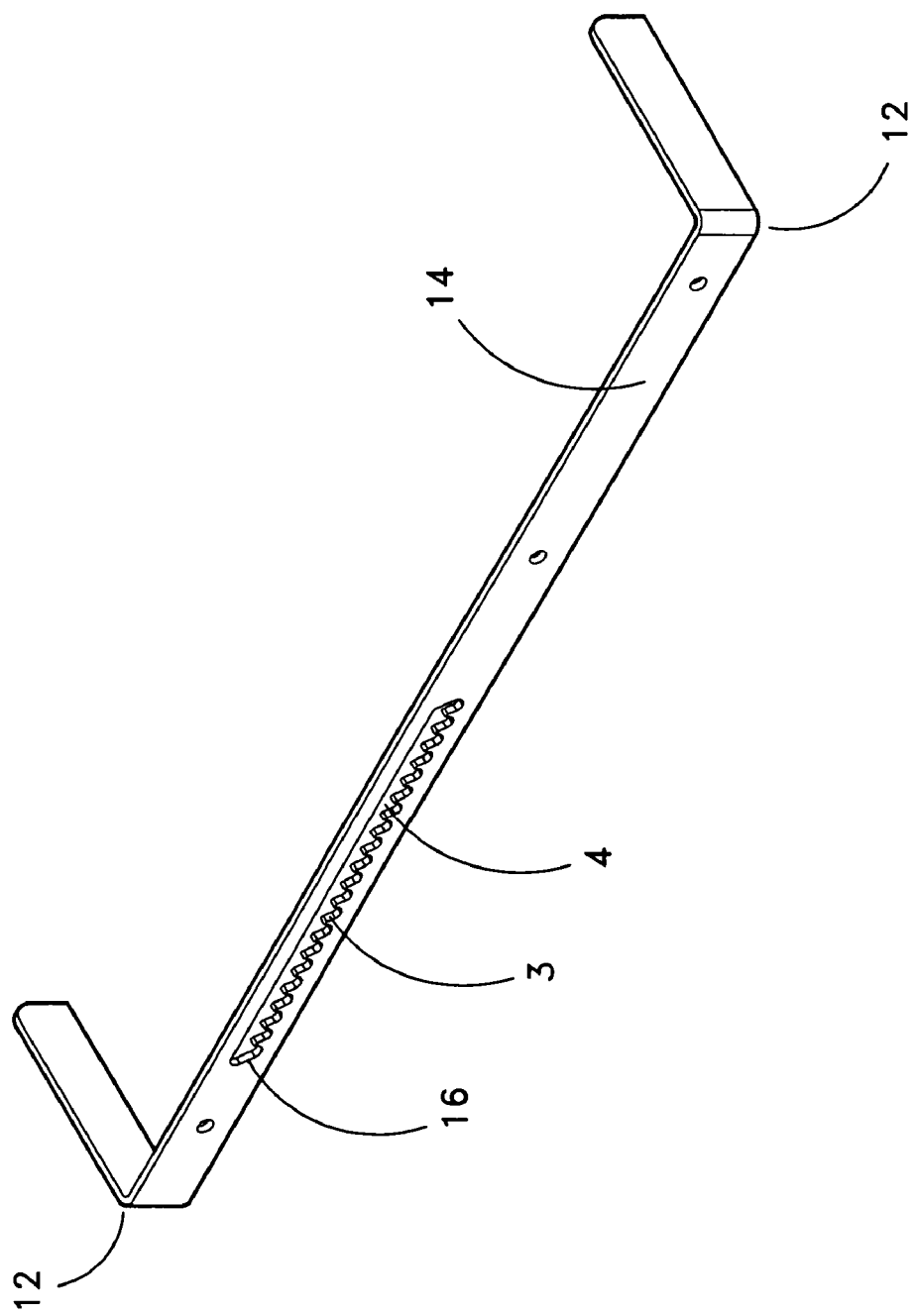
FIG. 6 is an isometric view of a support bar.

Now referring primarily to FIGS. 4 to 6, a base pedestal (1) of a supplemental support apparatus in some embodiments may include at least four bend angles (12). A bend angle (12) may be understood to include a surface formed into a bend. Naturally, it may be appreciated that a bend angle may take any variety of shapes, including for example any discrete angle between 0 degrees and 360 degrees as well as even a variety of arcs or curves. Moreover, a bend angle (12) of a base pedestal (1) may confer a degree of stability to a supplemental support apparatus. Accordingly, a supplemental support method may involve resisting a destabilizing force with a base pedestal (1) including at least four bend angles (12).

In certain embodiments, a base pedestal (1) of a supplemental support apparatus may include a first base strip (13) joined to a second base strip (14) in substantially opposed parallel relation. The term strip may be understood to include an elongated and narrow piece of material that has been substantially flattened to a substantially uniform thickness. The term base strip may be understood to include a strip used as part of a base pedestal (1) of a supplemental support apparatus. The term substantially opposed parallel relation may be understood to include being arranged so as to be parallel and opposite to one another, and indeed perhaps even equidistant from one another. In some embodiments, a first base strip (13) may include at least two bend angles (12), and a second base strip (14) may include at least two bend angles (12).

In certain embodiments, a cutout (2) disposed on a base pedestal (1) may be a first cutout (15) disposed on a first base strip (13) and a second cutout (16) disposed on a second base strip (14). A second cutout (16) may be configured in mirror-image relation to a first cutout (15), and may be arranged on a second base strip (14) so as to be in substantially opposed parallel relation to a first cutout (15) disposed on a first base strip (13). As a result, the arrangement of a first cutout (15) and a second cutout (16) may result in a pair of matching slots (4) of each said serrated lower edge (3) of a first cutout (15) and a second cutout (16). Consequently, it may be appreciated that a stop adjustment element (9) in certain embodiments may be configured to be disposed within any individual pair of matching slots (4) of each serrated lower edge (3) of a first cutout (15) and a second cutout (16). Accordingly, a supplemental support method may involve translating a stop adjustment element (9) from any individual pair of matching slots (4) of each said serrated lower edge (3) of a first cutout (15) and a second cutout (16) to any other individual pair of matching slots (4) of each said serrated lower edge (3) of a first cutout (15) and a second cutout (16).

Figure 7:
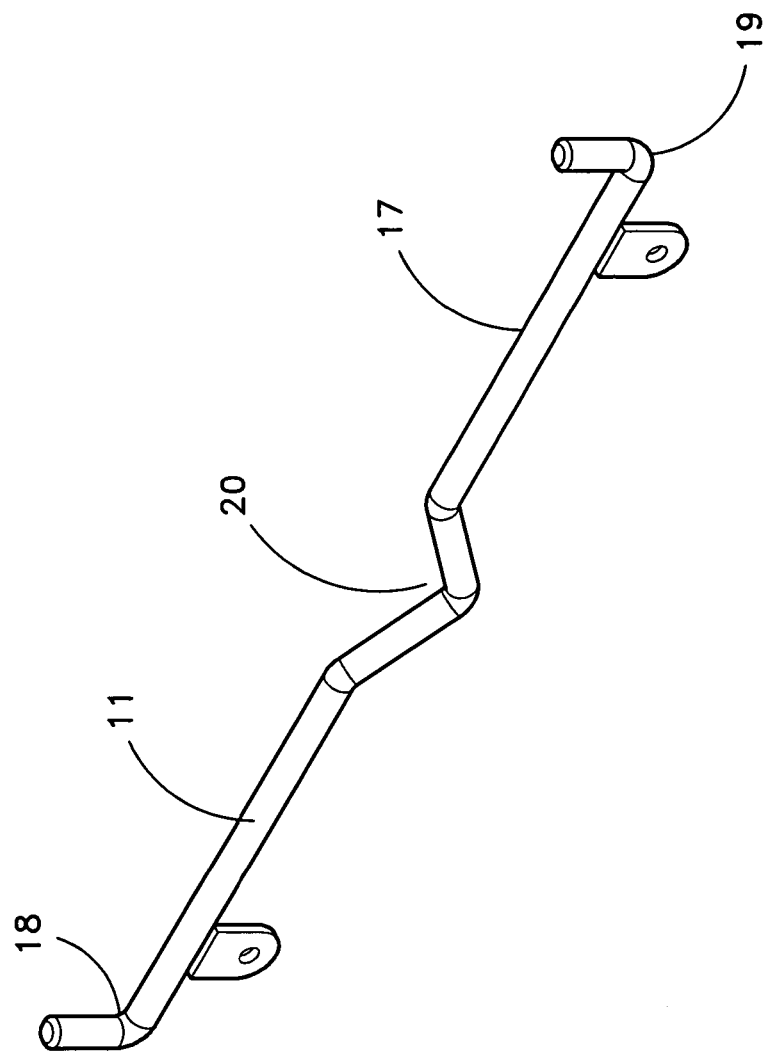
FIG. 7 is an isometric view of a vertical support member.

Now referring primarily to FIG. 7, a supplemental support surface (11) in some embodiments may be a support bar (17). A support bar (17) may be a supplemental support surface (11) configured into the shape of a bar. Naturally, it may be appreciated that in various embodiments such a bar may take any variety of shapes, including perhaps a bar having an elongated cylindrical shape or perhaps an elongated flattened shape. A support bar (17) may further include at least one retention element. By the term retention element, it may be understood that support bar (17) may have an element joined thereto that tends to retain in place an item placed on the surface of support bar (17). Examples of retention elements may include barriers, mechanical fasteners, adhesives, or even magnets. In some embodiments, a retention element may be a raised retention element. By the term raised retention element, it may be understood that a retention element may be disposed on a support bar (17) such that it lies above a horizontal plane of a support bar (17). Accordingly, in certain embodiments a support bar (17) may have a first raised bend angle (18) located at a first end of a support bar (17) and a second raised bend angle (19) located at a second end of a support bar (17). It may be appreciated that a first raised bend angle (18) and a second raised bend angle (19) may retain an item placed on support bar (17), perhaps by preventing such an item from sliding off of the ends of support bar (17). In other embodiments, a retention element may be a depressed retention element. By the term depressed retention element, it may be understood that a retention element may be disposed on a support bar (17) such that it lies below a horizontal plane of a support bar (17). Accordingly, in certain embodiments a support bar (17) may have a depressed V-angle (20) disposed on the support bar (17). It may be appreciated that a depressed V-angle (20) may retain an item placed on support bar (17), perhaps by allowing such an item to rest securely within a V-shaped depression by the force of gravity. Moreover, it further may be appreciated that a depressed retention element need not be only V-shaped, but indeed may be in the shape of a U, or perhaps any shape sufficient to cradle an item placed on support bar (17) by the force of gravity.

In some embodiments, a supplemental support apparatus may be a hand portable toolbox dimensioned supplemental support apparatus. By the term hand portable toolbox dimensioned, it may be understood that a supplemental support apparatus may be sized to dimensions corresponding to the space within a hand portable toolbox. In some embodiments, a hand portable toolbox dimensioned supplemental support apparatus may be a supplemental support apparatus not exceeding 21 inches in length, 9 inches in width, and 3 inches in height in a collapsed state. By the term collapsed state, it may be understood that a supplemental support apparatus may achieve a collapsed state when a separation distance between a supplemental support surface (11) and a base pedestal (1) is adjusted to achieve its minimum possible value. It may be appreciated that a hand portable toolbox dimensioned supplemental support apparatus may perhaps be capable of transport within a hand portable toolbox. Moreover, a supplemental support method may include accomplishing each step of such a method within a hand portable toolbox dimensioned volume of space. A hand portable toolbox dimensioned volume of space may be a volume of space substantially equivalent to the volume of space within a hand portable toolbox. In certain embodiments, accomplishing each step of a supplemental support method within a hand toolbox dimensioned volume of space may involve accomplishing each step of such a method within a volume of space not exceeding 21 inches in length, and 9 inches in width, and 5.5 inches in height.

In some embodiments, a supplemental support apparatus may include a workpiece supported by a supplemental support surface (11). A workpiece may be an item upon which work may be performed, possibly through manual labor. Examples of workpieces may include lumber to be cut or sheet metal to be welded. Accordingly, a supplemental support method in some embodiments may involve supporting a workpiece with a supplemental support surface (11).

Accordingly, now referring to FIGS. 1-7, certain embodiments of the inventive technology may include a supplemental support apparatus comprising six pieces and perhaps 5 nuts and bolts as well as several washers. Two base strips, a first base strip (13) and a second base strip (14), may each be dimensioned to 1" by ⅛" by 28", with bend angles (12) located 4" from each end of each base strip, bent at 90 degree angles. A first base strip (13) may prevent a supplemental support apparatus from tipping during use while sliding a material on a supplemental support surface (11). A second base strip (14) may be a mirror image of a first base strip (13), except with bend angles (12) in the opposite direction. A first base strip (13) may have a first cutout (15) and a second base strip (14) may have a second cutout (16), each cutout including a serrated lower edge (3) to make incremental matching pairs of slots (4). Each base strip may be bolted together with three ¼" bolts, where two of the bolts may hold two vertical support members (5) in a space between a first base strip (13) and a second base strip (14). Two vertical support members (5) each may be dimensioned to ¾" by ⅛" by 5", with ¼" holes on each end corresponding to a first pivot point (6) and a second pivot point (7). A vertical adjustment member (8) also may be dimensioned to ¾" by ⅛" by 5", with ¼" holes on each end corresponding to a stop adjustment element (9) and a third pivot point (10). Each vertical support member (5) may be connected to two holes in each base strip by ¼" bolts, perhaps to make the supplemental support apparatus adjustable from about 2" in height to about 5.5" in height, possibly in order to accommodate different saw base heights as well as differences in job site terrains. A vertical adjustment member (8) may be joined only to one vertical support member (5) at a third pivot point (10), and a stop adjustment element (9) may comprise a ¼" steel dowel welded in one ¼" hole of a vertical adjustment member (8) and may hang freely within a cutout (2). The dowel may sit within any matching pair of slots (4) of each serrated lower edge (3) of each cutout (2) and may be used to adjust a separation distance between support bar (17) and each base strip. A support bar (17) may be joined to each vertical support member (5) by two weld tabs with ¼" holes. Each weld tab may be welded to the underside of a support bar (17). A support bar (17) may be a ⅜" solid steel rod about 17" in length. A first raised bend angle (18) may be located about 1" from a first end of support bar (17) and a second raised bend angle (19) may be located about 1" from a second end of support bar (17). Each raised bend angle may be bent upward at 90 degree angles in the same direction at 1" lengths and may prevent a workpiece placed on a support bar (17) from sliding off the ends. At about the middle, a support bar (17) may be bent to the shape of a V-angle (20), perhaps to secure round pipe or other irregularly shaped construction items from rolling on a support bar (17). With the different angles bent, a support bar (17) may become about 14" in length. It may be appreciated that a supplemental support apparatus may be made of a material of sufficient strength and durability to withstand the conditions that typically may be found on a construction industry job site, which in some embodiments may be mild steel.

In various embodiments, the inventive technology may be used in some applications to support and align items upon which a manual task may be performed, such as lengths of wood, square tube, round pipe, and sheet metals for use during operations including sawing, cutting, and bracing procedures, and perhaps involving hand tools such as chop saws, miter saws, circular saws, hand saws, or possibly even plasma and gas torches. The inventive technology perhaps may be employed by users including persons involved in varied construction and contracting industries such as welding, fabricating, woodworking, carpentry, automotive, plumbing, and possibly even home hobbyists for "do it yourself" applications.

For example, in certain embodiments, to saw boards and lengths of various sized square tube or round pipe as well as flat steel, a user may place a supplemental support apparatus on either side of a saw, or in some embodiments possibly one supplemental support apparatus on each side of a saw, and then adjust the separation distance between supplemental support surface (11) and base pedestal (1) to match the height of a flat surface on a base of the saw being used. It may be that the separation distance may be adjusted by one hand, leaving the user's other hand free. A supplemental support apparatus may then perhaps support the material being cut, possibly preventing the cut material from dropping suddenly and causing an uneven cut or premature fracture.

In another example, some embodiments may involve using a supplemental support apparatus in conjunction with a plasma or gas cutting torch, perhaps in certain embodiments on sheet steel materials. It may be that the relatively small surface area of a support bar (17) may minimize the chance that a user may cut over a surface area of the supplemental support apparatus, thereby possibly reducing the chance of a sudden upward blowback of slag and sparks toward the user and perhaps preventing possible injury or a sloppy cut.

Other examples in various embodiments may include placing a supplemental support apparatus under boards to align, brace, and fit for glue-ups or placing a supplemental support apparatus under heavy metal pipe or tubing for use as a jack stand for support, alignment, and fitting during tack welding, welding, and torch cutting.

Several advantages may attend the inventive technology. A supplemental support apparatus in some embodiments may be relatively compact. This may allow the supplemental support apparatus to be transported with relative ease from job site to job site or quickly from one location to another location within a particular job site, perhaps even within a convenient storage device such as a hand portable toolbox. A supplemental support apparatus in certain embodiments may also be relatively quick to set up and break-down between uses, further reducing the time and effort required for its use. Additionally, embodiments of a supplemental support apparatus having a workspace correlated overall height may increase the locations at which hand tools having an integrated work surface, such as chop saws or miter saws, may be used. In particular, such a workspace correlated overall height may be coordinated to the work surface of a chop saw or miter saw, and not the location on which the chop saw or miter saw may be placed. For example, such a supplemental support apparatus may be able to be placed on the same surface as a chop saw or miter saw, such as a workbench or perhaps even the ground. This may eliminate the height differential problems that may be associated with conventional support stands, such as sawhorses. Embodiments of the invention may also eliminate the need to find a makeshift supplement support at a job site and the associated problems of uneven cuts, premature factures, bends in the cut item, and unstable support prone to slip or collapse.

As may be easily understood from the foregoing, the basic concepts of the present invention may be embodied in a variety of ways. It involves both supplemental support techniques as well as devices to accomplish the appropriate supplemental support. In this application, the supplemental support techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element that causes that action. Similarly, each physical element disclosed should be understood to encompass a disclosure of the action that that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting" Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the supplemental support devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A compact variably-adjustable support stand comprising:

a first base strip, wherein said first base strip includes at least two bend angles;

a first cutout disposed on said first base strip, wherein said first cutout includes a serrated lower edge;

a second base strip joined to said first base strip in substantially opposed parallel relation, wherein said second base strip includes at least two bend angles;

a second cutout disposed on said second base strip, wherein said second cutout is configured in mirror-image relation to said first cutout, and wherein said second cutout is arranged in substantially opposed parallel relation to said first cutout;

at least two vertical support members, wherein each said vertical support member has a workspace correlated adjustment length, and wherein each said vertical support member includes a first pivot point and a second pivot point, and wherein each said first pivot point and each said second pivot point are separated by an equal distance along each said vertical support member, and wherein each said vertical support member is joined to said first base strip and said second base strip at each said first pivot point, and wherein each said vertical support member is arranged to define an equal angle with respect to said first base strip and said second base strip;

a vertical adjustment member, wherein said vertical adjustment member includes a third pivot point and a stop adjustment element, and wherein said vertical adjustment member is joined to one said vertical support member at said third pivot point, and wherein said stop adjustment element is configured to be disposed within any individual pair of matching slots of each said serrated lower edge of each said cutout; and a support bar, wherein said support bar is joined to each said vertical support member at each said second pivot point, and wherein said support bar includes at least one raised retention element and at least one depressed retention element.

2. A compact variably-adjustable support stand as described in claim 1, wherein said workspace correlated adjustment length comprises a length that does not exceed 5 inches.

3. A compact variably-adjustable support stand as described in claim 1, wherein said at least one raised retention element comprises a first raised bend angle located at a first end of said support bar and a second raised bend angle located at a second end of said support bar.

4. A compact variably-adjustable support stand as described in claim 1, wherein said at least one depressed retention element comprises a depressed V-angle disposed on said support bar.

5. A compact variably-adjustable support stand as described in claim 1, wherein said compact variably-adjustable support stand does not exceed 21 inches in length, and wherein said compact variably-adjustable support stand does not exceed 9 inches in width, and wherein said compact variably-adjustable support stand does not exceed 3 inches in height in a collapsed state.

6. A supplemental support apparatus comprising:
a base pedestal;
a cutout disposed on said base pedestal, wherein said cutout includes a serrated lower edge;
at least two vertical support members, wherein each said vertical support member includes a first pivot point and a second pivot point, and wherein each said vertical support member is joined to said base pedestal at each said first pivot point;
a vertical adjustment member, wherein said vertical adjustment member includes a third pivot point and a stop adjustment element, and wherein said stop adjustment element is configured to be disposed within any individual slot of said serrated lower edge of said cutout; and
a supplemental support surface, wherein said supplemental support surface is joined to each said vertical support member at each said second pivot point.

7. A supplemental support apparatus as described in claim 6, further comprising a workspace correlated overall height.

8. A supplemental support apparatus as described in claim 7, wherein said workspace correlated overall height comprises a height from about 2 inches to about 5.5 inches.

9. A supplemental support apparatus as described in claim 7, wherein said workspace correlated overall height comprises a height correlated to an integrated work surface of a hand tool.

10. A supplemental support apparatus as described in claim 7, wherein each said vertical support member has a workspace correlated adjustment length.

11. A supplemental support apparatus as described in claim 10, wherein said workspace correlated adjustment length comprises a length that does not exceed 5 inches.

12. A supplemental support apparatus as described in claim 10, wherein said workspace correlated adjustment length comprises a length correlated to an integrated work surface of a hand tool.

13. A supplemental support apparatus as described in claim 6, wherein said supplemental support surface is arranged in substantially parallel relation to said base pedestal.

14. A supplemental support apparatus as described in claim 13, wherein each said first pivot point and each said second pivot point are separated by an equal distance along each said vertical support member, and wherein each said vertical support member is arranged to define an equal angle with respect to said base pedestal.

15. A supplemental support apparatus as described in claim 14, further comprising a parallel surface adjustment range of said supplemental support surface.

16. A supplemental support apparatus as described in claim 6 wherein said base pedestal comprises a base pedestal including at least four bend angles.

17. A supplemental support apparatus as described in claim 16, wherein said base pedestal including at least four bend angles comprises a first base strip joined to a second base strip, and wherein said first base strip includes at least two bend angles, and wherein said second base strip includes at least two bend angles.

18. A supplemental support apparatus as described in claim 6 wherein said supplemental support surface comprises a support bar.

19. A supplemental support apparatus as described in claim 18, wherein said support bar includes at least one raised retention element.

20. A supplemental support apparatus as described in claim 19, wherein said at least one raised retention element comprises a first raised bend angle located at a first end of said support bar and a second raised bend angle located at a second end of said support bar.

21. A supplemental support apparatus as described in claim 18, wherein said support bar includes at least one depressed retention element.

22. A supplemental support apparatus as described in claim 21, wherein said at least one depressed retention element comprises a depressed V-angle disposed on said support bar.

23. A supplemental support apparatus as described in claim 6 wherein said supplemental support apparatus comprises a hand portable toolbox dimensioned supplemental support apparatus.

24. A supplemental support apparatus as described in claim 23, wherein said hand portable toolbox dimensioned supplemental support apparatus does not exceed 21 inches in length, and wherein said hand portable toolbox dimensioned supplemental support apparatus does not exceed 9 inches in width, and wherein said hand portable toolbox dimensioned supplemental support apparatus does not exceed 3 inches in height in a collapsed state.

25. A supplemental support apparatus as described in claim 6 further comprising a workpiece supported by said supplemental support surface.

26. A supplemental support apparatus as described in claim 6 wherein said vertical adjustment member is joined to one said vertical support member at said third pivot point.

* * * * *